United States Patent [19]

Yamada et al.

[11] Patent Number: 5,985,983
[45] Date of Patent: Nov. 16, 1999

[54] FLUORORESIN COATING COMPOSITION

[75] Inventors: Katsuya Yamada; Nobutaka Matsushita; Hideki Kashihara; Shigeyoshi Ohwaki; Tohru Kashiwagi; Makoto Nakabayashi; Masahiro Miyamoto, all of Osaka, Japan

[73] Assignee: Sumitomo Electric Industries, Ltd., Osaka, Japan

[21] Appl. No.: 08/217,561

[22] Filed: Mar. 25, 1994

Related U.S. Application Data

[63] Continuation-in-part of application No. 07/948,249, Sep. 21, 1992, abandoned.

[30] Foreign Application Priority Data

| Sep. 23, 1991 | [JP] | Japan | 3-315615 |
| Sep. 8, 1993 | [JP] | Japan | 5-258833 |
| Dec. 31, 1993 | [JP] | Japan | 5-355219 |

[51] Int. Cl.$^6$ ...................................... C08K 5/06

[52] U.S. Cl. ........................... 524/520; 524/376; 524/544

[58] Field of Search ................................... 524/376, 375, 524/520, 544, 545, 430

[56] References Cited

U.S. PATENT DOCUMENTS

| 2,686,767 | 8/1954 | Green . | |
| 3,911,072 | 10/1975 | Saito | 526/254 |
| 4,278,773 | 7/1981 | Kleber | 524/545 |
| 5,219,910 | 6/1993 | Stahl | 524/236 |
| 5,242,962 | 9/1993 | Jahn | 524/197 |

*Primary Examiner*—Christopher Henderson
*Attorney, Agent, or Firm*—Sughrue, Mion, Zinn, Macpeak & Seas, PLLC

[57] ABSTRACT

A fluororesin coating composition comprising a dispersing medium and fluororesin particles dispersed therein, the dispersing medium mainly comprising a surfactant, and a coated article obtained using the coating composition.

14 Claims, 1 Drawing Sheet

FLUORORESIN COATING COMPOSITION

This is a Continuation-In-Part of application Ser. No. 07/948,249, filed Sep. 21, 1992, now abandoned.

FIELD OF THE INVENTION

The present invention relates to a fluororesin coating composition and a coated article obtained using the composition. More particularly, the present invention relates to a fluororesin coating composition for use in obtaining fluororesin-coated article having a uniform colored coating or bearing a display such as a scale, design, or character, and to such a coated article obtained using the composition. The present invention also relates to a process for the preparation of a fluororesin-coated plate and a process for the preparation of a fluororesin-coated shaped article, such as inner pot for rice cooker by the screen coating with a fluororesin coating free of or containing a pigment.

BACKGROUND OF THE INVENTION

Hitherto, stamping has been the only technique for displaying scale marks or other patterns on fluororesin-coated articles, in which technique a fluororesin-coated article is physically impressed by pressing or other means to produce an impressed mark, etc., or a base physically impressed beforehand is coated with a fluororesin coating composition to utilize the shadows resulting from the impressing. However, this technique has serious problems as follows.

First, in the case of the former method in which a fluororesin-coated article is physically impressed by pressing or other means, since the impressed part of the coated article is deformed at an exceedingly high curvature, the fluororesin coating layer is stretched simultaneously and is apt to peel off the base or develop pinholes, cracks, or other defects. Through such pinholes or cracks, water or rice broth penetrates into the fluororesin coating film to cause corrosion of the base, peeling of the coating layer, discoloration, etc.

The second problem is that the display is not easily recognizable because the recognition thereof is based only on shadows resulting from impressing. This problem is becoming very severe when the product of the fluororesin-coated article has multiple functions. For example, since inner pots of rice cookers, in particular, have come to be required to have multiple functions and, with this trend, displays such as scale marks are not limited to one kind, i.e., those for ordinary rice cooking, but range over various kinds including those for cooking rice together with red beans, for cooking rice gruels seasoned with miso or soy, and for cooking glutinous rice. Therefore, there are increasing numbers of cases in which three or four scales are impressed on one product of the fluororesin-coated article such as inner pot of rice cooker.

As expedients for overcoming these problems, various scale-displaying techniques have been proposed. For example, JP-A-60-232116 discloses a technique of producing a scale display by coating impressed parts of a pot with a fluororesin having a color different from that of the pot. (The term "JP-A" as used herein means an "unexamined published Japanese patent application".) However, this technique has a drawback that it requires troublesome steps and is, hence, industrially disadvantageous. In addition, the above technique has a further disadvantage that since the depressed parts of the impressed parts remain almost as it is in the pot produced, the presence of the scale marks is inconvenient for cleaning the pot, as in the case of the pots produced by prior-art techniques.

Further improvements of the above-described technique are disclosed in JP-A-1-170428 and JP-A-2-36815. In these improved displaying techniques, scale marks or other patterns are formed on a pot having a fluororesin coating but bearing no impressed marks, by printing the pot on its inner side with a fluororesin having a color different from that of the coating. This method, however, also is defective in the following two points.

First, the scale marks printed may disappear by wear because the display constitutes the outermost layer.

Second, the existing acute problems accompanying the use of a conventional fluororesin coating composition to form such a scale display have not been fully overcome, such as problems concerning the cissing or running of the coating composition on the fluororesin coating layer, adhesion to the base or fluororesin coating layer, and the flow characteristics of the fluororesin coating composition as a printing-use coating fluid, i.e., as a printing ink.

Specifically, this method is, for example, defective in that (1) when a commercially available fluororesin coating composition is used to form printed marks on a fluororesin layer, the coating composition applied suffers cissing due to the water repellency of the fluororesin layer, so that clear printed marks are difficult to form, and (2) if printing is conducted on a base made of Al or the like, it is difficult to obtain a practically sufficient adhesion strength.

The above problem (1) of coating composition cissing may be solved by using a fluororesin coating composition which has been thickened by increasing the solid content thereof to a value considerably higher than those of commercially available fluororesin coating compositions. However, use of such a coating composition poses new problems, for example, that the high viscosity of the coating composition results in increased printed mark thicknesses to give projected printed marks, and that the coating composition necessarily has poor leveling properties, which are characteristic of dispersion-type coating compositions having high solid contents, and the resulting printed surface has poor smoothness and the printed marks have uneven thicknesses. Although the problem of the increase in printed mark thickness may be overcome by thickening a fluororesin coating composition by incorporating a thickening agent or other additive, the thus-thickened composition comes to have structural viscosity such as jelly-like viscosity and, as a result, uniform printing is also difficult. Problem (2) of insufficient adhesion above may be solved by incorporating into a fluororesin a primer or adhesive ordinarily used for this purpose. However, printed marks formed from such a coating composition necessarily have a brownish color attributable to the adhesion-improving ingredient, so that the color of the printed marks are limited to dark ones such as black.

As apparent from the above, a smooth and flat display, such as scale marks, which is desired in the field of fluororesin-coated articles has been unable to be attained by a mere combination of common techniques or by an improvement that can be easily made by a skilled artisan in the art.

As inner pots for rice cookers, inner vessels for thermoses, frying pans, etc. there have been widely used those which have been coated with a fluororesin on the inner surface thereof. Heretofore, these products have been prepared by coating the entire surface of a substrate such as aluminum plate with a fluororesin coating composition free of or containing a pigment by spin coating process (see "Introduction to Coating Apparatus and Process", 2nd edition, K. K. Sogo Gijutu Center, Apr. 2, 1990, page 197), drying and sintering the coated substrate, and, if the fluororesin coating contains a pigment, coating the material further with a pigment-free fluororesin coating, drying and sintering the coated substrate, and then mechanically shaped by pressing.

However, the spin coating process has manufacturing disadvantages that it causes a great loss of the coating composition, requiring a recovery system. This coating process is also principally disadvantageous, since the resulting coating is thicker at the center and the edge than the other area. Further, the area to be coated cannot be specified, causing undesirable areas to be coated. Moreover, it is difficult to obtain a coating having a thickness of not less than 20 μm by a single coating.

On the other hand, the screen printing process (as described, e.g., in *Introduction to Coatinq Apparatus and Process*, 2nd edition, K. K. Sogo Gijutu Center, Apr. 2, 1990, page 197) is used in all printing fields today. This printing process causes little loss of the coating composition and can provide a coating in any pattern. This printing process requires only a light weight and inexpensive apparatus. Thus, the screen printing process provides various practical conveniences.

However, if the screen printing process is applied to the coating with a fluororesin, a coating composition containing a fluororesin must be optimized for the screen printing. Since a fluororesin is generally insoluble in a solvent, a coating composition for screen printing containing a fluororesin cannot be obtained in accordance with the conventional manner.

Application of a fluororesin coating composition to the screen printing process is described in JP-B-2-61308 (The term "JP-B" as used herein means an "examined Japanese patent publication")), which discloses a process for the formation of a decoration on a polytetrafluoroethylene (PTFE) coating. In some detail, this process comprises coating a metallic substrate with an aqueous dispersion of PTFE, drying the coated substrate, screen-printing a composition containing a fluorocarbon powder before sintering, and then baking for sintering the two layers at the same time. However, there is no reference to a technique for directly coating a metallic substrate with a fluororesin by screen printing.

JP-A-3-217470 describes a process which comprises printing on a metallic substrate an ink composition obtained by mixing a resin that undergoes thermal decomposition at 450° C. or lower with a fluororesin powder, etc., and then decomposing the resin under heating. However, this process requires complete decomposition of a significant quantity of the resin under heating, inevitably requiring a prolonged processing at a high temperature. Therefore, no matter how heat-resistant it is, the fluororesin inevitably undergoes thermal decomposition during this process even though it is heat-resistant, adversely affecting physical properties such as abrasion resistance and nontackiness.

Further, all the foregoing processes are aimed at obtaining a decorative effect by screen-printing a pattern such as character and graphic but are not disclosed as a process for coating the entire surface of a substrate with a fluororesin.

Therefore, no screen printing processes and coatings have been heretofore disclosed for the formation of a transparent uniform fluororesin coat having a thickness of not less than 20 μm on substantially the entire surface of a substrate.

SUMMARY OF THE INVENTION

Accordingly, an object of the present invention is to provide a fluororesin coating composition which can be advantageously used for forming a display such as scale marks without using stamping.

Another object of the present invention is to provide fluororesin-coated articles having a fluororesin-based colored coating or display which has no tendency of wear, clear colors, and sufficient adhesion strength.

Further object of the present invention to eliminate difficulties with the industrial production by spin coating process and to develop a process for screen-coating of a fluororesin free of or containing a pigment capable of coating on a larger area and substantially all the surface of a substrate rather than merely forming a small area pattern.

Other objects and effects of the present invention will be apparent from the following description.

The present invention relates to a fluororesin coating composition comprising a dispersing medium and fluororesin particles dispersed therein, the dispersing medium mainly comprising a surfactant.

In the above fluororesin coating composition according to the present invention, the coating composition may further comprises pigment particles dispersed in the dispersing medium.

The present invention also relates to a coated article obtained by applying a fluororesin coating composition on a substrate uniformly or pattern-wise thereby to form a uniform or patterned coating of the composition, drying the coating, and then sintring the coating, the fluororesin coating composition comprising a dispersing medium and fluororesin particles dispersed therein, the dispersing medium mainly comprising a surfactant.

In the above coated article according to the present invention, the coating composition may further comprises pigment particles dispersed in the dispersing medium. The substrate may have a roughened surface and the coating may be directly formed on said roughened surface. The substrate of the coated article according to the present invention may be a fluorine resin coated article comprising a base material having thereon a fluororesin layer.

The coated article according to the present invention may have at least one overcoat layer which may be produced by using any conventional fluororesin composition containing or not containing pigments. The overcoat layer may be uniform or may have patterns such as a scale, design, or character. The overcoat layer may also be formed by using a coating composition according to the present invention.

The present invention also relates to a coated article obtained by applying the fluororesin coating composition on the substrate pattern-wise or uniformly thereby to form a patterned or uniform coating of said composition, and then covering the resulting surface with a second fluororesin coating composition containing substantially no pigment and adhesive.

The present invention also relates to a coated article obtained by applying a pigment-free fluororesin coating composition on a substrate uniformly thereby to form a uniform coating of the pigment-free composition, and then applying a pigment-containing fluororesin coating composition on the resulting surface pattern-wise thereby to form a patterned coating of the pigment-containing composition, the pigment-free fluororesin coating composition comprising a dispersing medium and fluororesin particles dispersed therein, the dispersing medium mainly comprising a surfactant, the pigment-containing fluororesin coating composition comprising a dispersing medium, fluororesin particles, and pigment particles, the fluororesin particles and the pigment particles being dispersed in the dispersing medium, the dispersing medium mainly comprising a surfactant.

The present invention also relates to a coated article obtained by applying a pigment-free fluororesin coating composition on a substrate uniformly thereby to form a uniform coating of the pigment-free composition, and then applying a pigment-containing fluororesin coating composition on the resulting surface uniformly thereby to form a uniform coating of the pigment-containing composition, the pigment-free fluororesin coating composition comprising a dispersing medium and fluororesin particles dispersed therein, the dispersing medium mainly comprising a surfactant, the pigment-containing fluororesin coating composition comprising a dispersing medium, fluororesin particles, and pigment particles, the fluororesin particles and the pigment particles being dispersed in the dispersing medium, the dispersing medium mainly comprising a surfactant.

The present invention also relates to a coated article obtained by applying a pigment-containing fluororesin coating composition on a substrate pattern-wise or uniformly thereby to form a patterned or uniform coating of the pigment-containing composition, and then applying a pigment-free fluororesin coating composition on the resulting surface uniformly thereby to form a uniform coating of the pigment-free composition, the pigment-free fluororesin coating composition comprising a dispersing medium and fluororesin particles dispersed therein, the dispersing medium mainly comprising a surfactant, the pigment-containing fluororesin coating composition comprising a dispersing medium, fluororesin particles, and pigment particles, the fluororesin particles and the pigment particles being dispersed in the dispersing medium, the dispersing medium mainly comprising a surfactant.

In the coated articles according to the present invention, the adhesion strength between the coating and said substrate is preferably 1.5 Kg/cm or more, and the coating preferably has an adhesion evaluation point of 8 or more as measured by a crosscut tape test in accordance with JIS K5400-1990, 8.5.2 after 10 times repetition of the tape application-stripping procedure.

The present invention also relates to a process for the preparation of a fluororesin-coated plate, which comprises coating substantially the entire surface of a flat substrate with a pigment-free or pigment-containing fluororesin coating composition comprising fluororesin particles dispersed in a dispersing medium mainly comprising a surfactant by a screen printing process; and drying and sintering the resulting coating.

In the above process for the preparation of a fluororesin-coated plate according to the present invention, the surfactant preferably comprises a nonionic surfactant having a chemical structure consisting essentially of alkyl and oxyalkylene consisting of a carbon atom, a hydrogen atom, and an oxygen atom, and being free of an aromatic ring and a carbon-carbon multiple bond.

The present invention also relates to a process for the preparation of a fluororesin-coated shaped article, in which a stress is applied to the coated plate obtained in the above process for the preparation of a fluororesin-coated plate, so as to be deformed into an arbitrary shape.

The present invention relates to a process for the preparation of a fluororesin-coated plate, which comprises coating substantially the entire surface of a flat substrate having a roughened surface with a fluororesin coating comprising fluororesin particles and pigment particles dispersed in a dispersing medium mainly comprising a surfactant by screen printing process, and drying and sintering the resulting coating.

In the above process for the preparation of a fluororesin-coated plate according to the present invention, the surfactant preferably comprises a nonionic surfactant having a chemical structure consisting essentially of alkyl and oxyalkylene consisting of a carbon atom, a hydrogen atom, and an oxygen atom, and being free of an aromatic ring and a carbon-carbon multiple bond.

In the process for the preparation of a fluororesin-coated plate, the resulting coated plate may be further pressed under heating.

The present invention also relates to a process for the preparation of a fluororesin-coated shaped article, in which a stress is applied to the coated plate obtained in the above processes for the preparation of a fluororesin-coated plate, so as to be deformed into an arbitrary shape.

The term "mainly comprising" as used herein means the component at least forms the maximum proportion in the composition. The amount of the surfactant in the dispersing medium is preferably 50% by weight or more, more preferably 60% by weight or more, further preferably 70% by weight or more, still further preferably 73.1% by weight or more, still further preferably 75.7% by weight or more, and the most preferably 77.5% by weight or more.

DETAILED DESCRIPTION OF THE INVENTION

Figure 1:
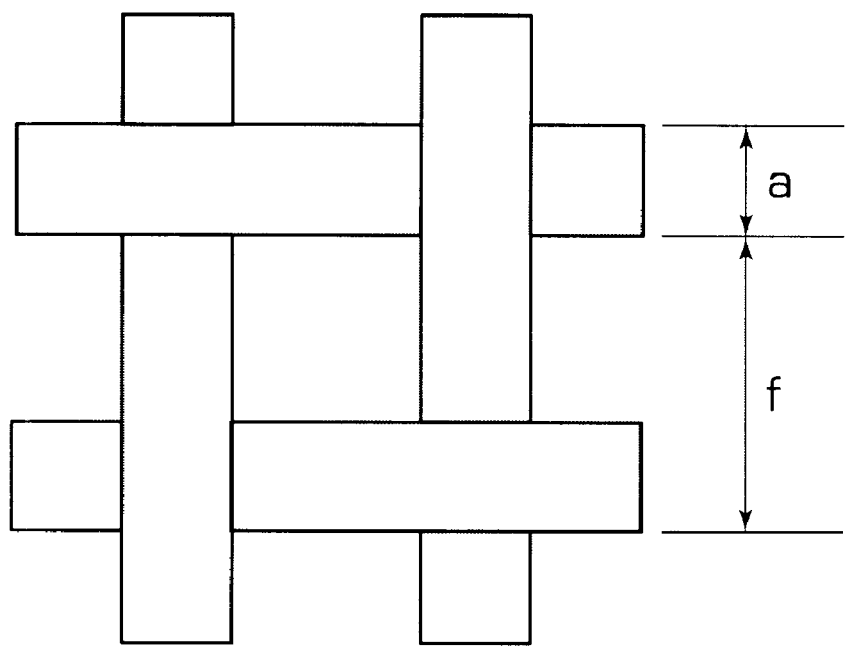
FIG. 1 is a schematic front view illustrating the structure of an ordinary screen mesh.

In the first aspect of the present invention, a fluororesin coating composition is provided which comprises a dispersing medium and, dispersed therein, fluororesin particles, the dispersing medium mainly comprising a surfactant.

The above fluororesin coating composition provided in the first aspect of the present invention involves the following preferred embodiments (a) to (j):

(a) A fluororesin coating composition provided in the first aspect of the present invention, in which the surfactant is a nonionic surfactant or a mixture of two or more nonionic surfactants;

(b) A fluororesin coating composition according to embodiment (a) above, in which the nonionic surfactants are selected from the group consisting of polyoxyethylene octylphenyl ether, polyoxyethylene nonylphenyl ether, polyoxyethylene dodecylphenyl ether, and fluorine-containing surfactants;

(c) A fluororesin coating composition provided in the first aspect of the present invention, in which the fluororesin particles comprise a heat-fusible fluororesin;

(d) A fluororesin coating composition according to embodiment (c) above, in which the heat-fusible fluororesin is PFA (tetrafluoroethylene-perfluoro(alkyl vinyl ether)copolymers) or FEP (tetrafluoroethylene-hexafluoropropylene copolymers);

(e) A fluororesin coating composition provided in the first aspect of the present invention, in which the fluororesin particles dispersed in a liquid medium comprise (A) those having an average particle diameter of 5 μm or more and (B) those having an average particle diameter of 1 μm or less, with the proportion of fluororesin particles (B) is from 20 to 80% by weight based on the total weight of fluororesin particles (A) and fluororesin particles (B);

(f) A fluororesin coating composition provided in the first aspect of the present invention, in which the pigment particles mainly comprise titanium oxide.

(g) A fluororesin coating composition according to embodiment (f) above, which further contains ultramarine as a coloring aid in an amount of from 0.2 to 3% by weight based on the amount of the pigment;

(h) A fluororesin coating composition according to embodiment (f) above, which has a solid content of from 20 to 60% by weight;

(i) A fluororesin coating composition according to embodiment (h) above, in which the proportion of the pigment is from 10 to 60% by weight based on the total weight of the solid components; and (j) A fluororesin coating composition provided in the first aspect of the present invention, which has a viscosity of from 1,000 to 100,000 cps at room temperature (about 20° C.) and shows a viscoelastic behavior similar to that of high-concentration polymer solutions.

In the second aspect of the present invention, a coated article is provided which is obtained by applying the first fluororesin coating composition as provided in the first aspect of the present invention on a fluororesin layer of a base fluororesin-coated article uniformly or pattern-wise thereby to form a uniform or patterned coating of the composition, and then covering the resulting surface with a second fluororesin coating composition containing substantially no pigment and adhesive. The pattern coating of the composition in the present invention is not particularly limited, and examples thereof include scale, design, character and other any marks.

The above coated article provided in the second aspect of the present invention involves the following preferred embodiments (k) and (l):

(k) A coated article provided in the second aspect of the present invention, in which the base fluororesin-coated article has been obtained by forming a base material into a desired shape such as a pot and then coating a fluororesin on the shaped base; and (l) A coated article provided in the second aspect of the present invention, in which the base fluororesin-coated article has been obtained by coating a fluororesin on a metal base in the form of a flat plate having a finely roughened surface, and the coated article provided in the second aspect of the present invention is to be shaped into a desired form such as a pot.

In the third aspect of the present invention, a coated article is provided which is obtained by applying the first fluororesin coating composition as provided in the first aspect of the present invention on a base having a finely roughened surface uniformly or pattern-wise thereby to form a uniform or patterned coating of the composition, and then covering the resulting surface with a second fluororesin coating composition containing substantially no pigment and adhesive. Example of the patterned coating of the composition include scale, design, character and other marks.

The above coated article provided in the third aspect of the present invention involves the following preferred embodiments (m) and (n).

(m) A coated article provided in the third aspect of the present invention, in which the base has been obtained by forming a base material into a desired shape such as a pot and then finely roughening a surface of the shaped base.

(n) A coated article provided in the third aspect of the present invention, in which the base is applied was a metal base in the form of a flat plate having a finely roughened surface, and the coated article provided in the third aspect of the invention is to be shaped into a desired form such as a pot.

In the fourth aspect of the present invention, a coated article is provided which is a coated article as provided in the second or third aspect of the invention, wherein the adhesion strength between the fluororesin layer of the first fluororesin coating composition and the fluororesin layer of the base fluororesin-coated article (second aspect) or the adhesion strength between layer of the first fluororesin coating composition and the base (third aspect) is 1.5 Kg/cm or more, and the fluororesin layer of the first fluororesin coating composition has an adhesion evaluation point of 8 or more as measured by a crosscut tape test in accordance with JIS K5400-1990, 8.5.2 after 10 times repetition of the tape application-stripping procedure.

In the fifth aspect of the present invention, a process for the preparation of a fluororesin-coated plate is provided, which comprises coating substantially the entire surface of a flat substrate with a pigment-free or pigment-containing fluororesin coating composition comprising fluororesin particles dispersed in a dispersing medium mainly comprising a surfactant by a screen printing process; and drying and sintering the resulting coating.

In the case of a pigment-containing coating composition to be coated on a flat substrate, the pigment-containing coating composition may have the similar embodiments as in the coating composition according to the first aspect of the present invention.

The fifth aspect of the present invention has at least the following embodiments:

(o) A process for the preparation of a fluororesin-coated plate according to the fifth aspect of the present invention, wherein the surfactant mainly comprising of a nonionic surfactant having a chemical structure consisting essentially of alkyl and oxyalkylene consisting of a carbon atom, a hydrogen atom, and an oxygen atom, and being free of an aromatic ring and a carbon-carbon multiple bond. The proportion of the nonionic surfactant is 50% by weight or more of the total surfactant.

(p) A process for the preparation of a fluororesin-coated plate according to the fifth aspect of the present invention, wherein the fluororesin particles have an average particle diameter of not more than the thickness t of the fluororesin coating and not more than the length of an opening of a screen mesh for screen printing process and the fraction x of the fluororesin in the pigment-free fluororesin coating composition satisfies the relationship shown by equation (1):

$$x > t/(d \cdot k) \tag{1}$$

wherein d is the average mesh thickness, and k is the opening ratio, each of which is represented by the following formulae:

$$d = 2a \times (a/f)^2 + a \times (1-(a/f)^2)$$
$$K = ((f-a)/f)^2$$

wherein a represents a thread diameter, and f represents the mesh pitch.

The opening of a screen mesh is (f−a).

In the sixth aspect of the present invention, a process for the preparation of a fluororesin-coated shaped article is provided, which comprises applying a stress to a fluororesin-coated plate obtained by the preparation process according to the fifth embodiment, preferably embodiment (o) or (p), so that it is deformed into an arbitrary shape.

In the seventh aspect of the present invention, a process for the preparation of a fluororesin-coated plate is provided, which comprises coating substantially the entire surface of a flat substrate having a roughened surface with a fluororesin coating comprising fluororesin particles and pigment particles dispersed in a dispersing medium mainly comprising a surfactant by screen printing process, and drying and sintering the resulting coating.

The seventh aspect of the present invention has at least the following embodiments:

(q) A process for the preparation of a fluororesin-coated plate according to the seventh aspect of the present invention, wherein the surfactant mainly comprising of a nonionic surfactant having a chemical structure consisting essentially of alkyl and oxyalkylene consisting of a carbon atom, a hydrogen atom, and an oxygen atom, and being free of an aromatic ring and a carbon-carbon multiple bond. The proportion of the nonionic surfactant is preferably 50% by weight or more, more preferably 70% by weight or more, and particularly preferably 90% by weight or of the total surfactant.

(r) A process for the preparation of a fluororesin-coated plate according to the seventh aspect of the present invention, wherein said fluororesin is PFA (tetrafluoroethylene-perfluoroalkylvinylether copolymer).

(s) A process for the preparation of a fluororesin-coated plate according to the foregoing embodiment (r), wherein PFA as a fluororesin is used in the form of a mixture of large particles having an average particle diameter of about 20 $\mu$m and small particles having an average particle diameter of about 7 $\mu$m.

(t) A process for the preparation of a fluororesin-coated plate according to the seventh aspect of the present invention, wherein the substrate is a metallic substrate and the roughening of the surface of the substrate is effected by anodic oxidation.

(u) A process for the preparation of a fluororesin-coated plate according to the seventh aspect of the present invention, wherein the substrate plate is an alloy plate comprising aluminum or a composite plate comprising a stainless steel plate and an alloy plate comprising aluminum laminated thereto.

(v) A process for the preparation of a fluororesin-coated plate according to the seventh aspect of the present invention, wherein the fluororesin particles have an average particle diameter of not more than the thickness t of the fluororesin coating and not more than the length of an opening of a screen mesh for screen printing process and the fraction x of nonvolatile components such as fluororesin and pigment in the fluororesin coating composition satisfies the relationship shown by equation (2):

$$x > t/(d \cdot k) \quad (2)$$

wherein d is the average mesh thickness, and k is the opening ratio, each of which is represented by the following formulae:

$$d = 2a \times (a/f)^2 + a \times (1-(a/f)^2)$$

$$K = ((f-a)/f)^2$$

wherein a represents a thread diameter, and f represents the mesh pitch.

In the eighth aspect of the present invention, a process for the preparation of a fluororesin-coated plate is provided, which comprises pressing the fluororesin-coated plate prepared by the seventh embodiment, preferably embodiment (q), (r), (s), (t), (u) or (v), under heating to a temperature around the melting point of the fluororesin. The heating temperature is preferably in the range of ±50° C. of the melting point of the fluororesin, and more preferably in the range of ±30° C. of the melting point of the fluororesin.

In the ninth aspect of the present invention, a process for the preparation of a fluororesin-coated shaped article is provided, which comprises applying a stress to a fluororesin-coated plate obtained by the seventh embodiment, preferably embodiment (q), (r), (s), (t), (u) or (v), or the eighth embodiment of the present invention, so that it is deformed into an arbitrary shape.

In all the embodiments of the present invention described above, the material of the substrate is not particularly limited, and examples thereof include aluminum, an aluminum alloy, a stainless steel, a steel, a composite plate comprising a stainless steel plate laminated thereto an aluminum alloy or aluminum plate. The substrate may have a roughened surface to which fluororesin coated layers are provided.

The fluororesin coating composition according to the first aspect of the present invention and the coated article according to the fourth aspect of the present invention are described in detail below.

The most characteristic feature of the fluororesin coating composition according to the first aspect of the present invention resides in that a viscoelastic behavior similar to that of high-concentration polymer solutions has been imparted thereto. Coating compositions containing ordinary fluororesins (e.g., PTFE (polytetrafluoroethylene), PFA, and FEP) as major resin components should be in the form of a dispersion because these fluororesins have extremely high chemical resistance and, hence, there is substantially no solvent that dissolves the fluororesins.

Further, in the case where the fluororesin coating composition contains pigment particles, since formation of a film from such a fluororesin coating composition necessitates high-temperature baking, it is essential that an inorganic pigment that does not decompose or deteriorate at the baking temperature be employed as a colorant for the coating composition.

As a result of the above limitations, almost all of the components which will constitute a coating layer to be obtained from such a fluororesin coating composition are present as dispersed solid particles in the coating composition. That is, such a fluororesin coating composition is a typical solid-dispersed type coating composition (coating dispersion). However, solid-dispersed type coating compositions have flow properties unsuited for ordinary printing techniques for forming patterns such as scale marks, designs, and characters.

Illustratively stated, coating dispersions having low solid contents suffer cissing, running or the like during printing. Coating dispersions having high solid contents show insufficient leveling properties because of the poor flowability which is characteristic of such dispersions and give printed patterns having considerably uneven thicknesses and impaired surface smoothness or projecting printed patterns having a large thickness, so that surface smoothness required of general fluororesin-coated articles cannot be obtained. As described hereinabove, if a coating dispersion having a low solid content is thickened by an ordinary method, for example, by adding a thickener or the like, the dispersion comes to have a structural viscosity (e.g., jelly-like viscosity), resulting only in flow properties unsuited for printing.

Because of the above, coating compositions of the high-concentration polymer solution type which are easily made to have adequate flow properties have been in ordinary printing techniques. Although the fluororesin coating composition according to the first aspect of the present invention is a solid-dispersed type coating composition, it shows a viscoelastic behavior similar to that of high-concentration polymer solutions and has flow properties suited for printing use, unlike conventional fluororesin coating compositions, due to the use of a surfactant as the major component of the dispersing medium. Because of such excellent properties of the coating composition of the present invention for printing use, the coating composition can easily be coated on a surface of a sintered fluororesin coating, which has not been realized by conventional coating compositions.

The surfactant employed in the present invention, therefore, is not particularly limited as long as it can impart the desired flow properties to the composition. It may be selected from a wide range of anionic, cationic, ampholytic, and nonionic surfactants; from surfactants of various compositions including polyoxyethylene surfactants and fluorine-containing surfactants; and from surfactants of a wide molecular weight range including more common low-molecular weight surfactants and high-molecular weight surfactants. These surfactants may be appropriately selected and used alone or as a mixture of two or more thereof so that the coating composition can have a viscosity in a range suited for a particular printing technique to be used.

From the standpoint of easily obtaining dispersion stability, a nonionic surfactant is preferably used. Representative examples thereof include polyoxyethylene octylphenyl ether, polyoxyethylene nonylphenyl ether, and polyoxyethylene dodecylphenyl ether. When a display to be formed by printing is of a high-lightness color such as white or light blue or of a high-chroma color such as blue or red, the display turn may sometimes brown during baking of the coating film due to glazing of the surfactant and this poses a problem. For such applications, use of a surfactant having a relatively low molecular weight is preferred since it is apt to volatilize during baking and is less apt to make the coating film brown. Representative examples of such a surfactant of a relatively low molecular weight include polyoxyethylene octylphenyl ether in which the polyoxyethylene chain is relatively short and a fluorine-containing surfactant having a low boiling point.

Specific examples of the polyoxyethylene octylphenyl ether in which the polyoxyethylene chain is relatively short include one represented by the following formula:

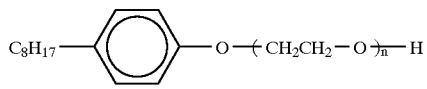

wherein n is 4.5 in average, which is commercially available under the trade name, "Octapol 45" by Sanyo Chemical Industries, Ltd.

From the standpoint of the dispersion stability of fluororesin particles, a fluorine-containing surfactant may be used. A fluorine-containing surfactant is advantageous when fluororesin particles having relatively poor dispersion stability are employed.

Examples of the fluorine-containing surfactant include a perfluoroalkylsulfonate (e.g., potassium perfluoroalkylsulfonate, ammonium perfluoroalkylsulfonate), a perfluoroalkylcarboxylate (e.g., potassium perfluoroalkylcarboxylate), a perfluoroalkyl quaternary ammonium salt (e.g., perfluoroalkyl trimethylammonium salt, perfluoroalkyl quaternary ammonium salt iodide), a perfluorobetaine, a perfluoroalkylphosphate, a perfluoroalkylamineoxide, a perfluoroalkylethyleneoxide adduct, a perfluoroalkylalkoxylate, a perfluoroalkyl oligomer, a fluoroalkylethyleneoxide adduct, and a fluoroalkylester. These fluorine-containing surfactants are commercially available under the trade names, "Unidain" by Daikin Industries, Ltd., "Fluorad" by 3M Corp., and "Surfron" by Asahi Glass Co., Ltd.

The dispersing medium can contain a small proportion of water or a solvent as a flowability modifier. Further, a small amount of water may be incorporated into the coating composition if fluororesin particles of a certain kind should be incorporated in the form of a dispersion in water. In any event, the amount of the ingredient(s) other than the surfactant in the dispersing medium should be small in the coating composition of the present invention. The upper limit of the amount of the ingredient(s) other than the surfactant may be at most about 20% by weight based on the amount of the dispersing medium, although it cannot be determined unconditionally because it is considerably affected by the surfactant selected and by the formulation for the coating composition, i.e., the solid content of the coating composition, the proportion of pigment in the solid components, the kind of pigment, etc.

Examples of the fluororesin employed in the coating composition of the present invention include PTFE (polytetrafluoroethylene), PFA (tetrafluoroethylene-perfluoro(alkyl vinyl ether) copolymers), FEP (tetrafluoroethylene-hexafluoropropylene copolymers), ETFE (tetrafluoroethylene-ethylene copolymers), CTFE (polychlorotrifluoroethylene), PVdF (polyvinylidene fluoride), and copolymers thereof. These may be used alone or as a mixture of two or more thereof.

Among the above fluororesins, PFA, FEP, ETFE, and CTFE which are heat-fusible fluororesins are preferred because coating compositions containing these fluororesins are less apt to develop coating film defects such as a pinhole even when they have a high pigment content. From the standpoint of heat resistance, PFA and FEP are preferably used.

Spherical fluororesin particles having an average particle diameter of 5 $\mu$m or more are preferably used since they have excellent film-forming properties. However, once such particles precipitate from a dispersion thereof, it may be difficult to re-disperse the particles. It is, therefore, preferred to use fluororesin particles having an average particle diameter of 1 $\mu$m or less in combination with those spherical fluororesin particles in an amount of from 20 to 80% by weight based on the total amount of all the fluororesin particles, because improved re-dispersibility can be obtained by the combined use of them.

In preparing the coating composition of the present invention, it is preferable to use such fluororesin particles as a powder because the dispersing medium therefor should mainly comprises a surfactant. It is, however, possible to add fluororesin particles in the form of a dispersion in water or a solvent as long as the effect of the present invention is not adversely affected. The amount of the surfactant in the dispersion medium is preferably 50% by weight or more, more preferably 60% by weight or more, further preferably 70% by weight or more, still further preferably 73.1% by weight or more, still further preferably 75.7% by weight or more, and the most preferably 77.5% by weight or more.

As the pigment for use in the fluororesin coating composition of the present invention, any conventional pigments may be employed. Representative examples thereof include white pigments such as titanium oxide and zinc white, black pigments such as carbon blacks including acetylene black, chromatic pigments such as ultramarine and red iron oxide, and flake pigments such as boron nitride, mica, pigment-coated mica, and fluorocarbons.

The particle size of the pigments is generally 10 $\mu$m or less, and preferably 1 $\mu$m or less. In the case of the flake pigments, the thickness of the particles is generally 10 $\mu$m or less, and preferably 1 $\mu$m or less, and the larger diameter may generally be 100 $\mu$m or less, and preferably 50 $\mu$m or less.

In the case where the coating composition to be produced is for use in forming such a display as a scale or character, a white pigment is advantageously used frequently. In this case, use of titanium oxide is preferred because it has high hiding power and is hence effective even in a small amount.

For the purpose of enhancing the brightness of the white color of titanium oxide to produce a more white impression, ultramarine may be used as a coloring aid. The amount of ultramarine to be incorporated is not determined unconditionally because it depends on the kind, particle diameter, and incorporated amount of titanium oxide, the thickness of the coating film to be formed, the condition of the glazed surfactant and other factors. However, the amount of ultramarine is preferably about from 0.2 to 3% by weight based on the total amount of the pigments.

The solid content of the coating composition and the proportion of the pigment in all the solid components can be suitably determined so that the coating composition, when printed on a base, gives a character or other design which has a color considerably different from that of the base and is clearly recognizable, and that the coating composition shows good adhesion to the base and has a viscosity suited for the printing technique to be used.

For example, in the case of a coating composition which is for use in white-character printing and employs titanium oxide as a pigment, the content of the pigment in the solid components is generally 10% by weight or more, preferably 15% by weight or more, in order to obtain sufficient whiteness, and the solid content of the composition is generally 20% by weight or more, preferably 30% by weight or more.

The coating composition is preferred to have such a viscosity that not only the coating composition does not suffer cissing even when printed on a fluororesin-coated article as a base and the composition does not suffer running even when printed on an etched aluminum plate or the like as a base, but also the composition is suited for printing operations. Specifically, the desired viscosity of the coating composition preferably is in the range of from 1,000 to 100,000 cps at room temperature (about 20° C.). A viscosity range particularly preferred for screen printing is from 2,000 to 50,000 cps, with the more preferred range thereof being from 5,000 to 20,000 cps, at room temperature (about 20° C.). In order that the coating composition have a viscosity in such ranges, the solid content of the composition is preferably from 20 to 60% by weight, more preferably from 30 to 50% by weight, most preferably from 40 to 50% by weight, in the case of using polyoxyethylene octylphenyl ether as a surfactant, although the preferred solid content range varies greatly depending on the kind of the surfactant used.

It has been found through investigations by the present inventors that practically sufficient adhesion strengths for coating films formed from the coating composition of the present invention are such that the adhesion strength between the base and the fluororesin layer of the coating composition of the present invention and the adhesion strength between the fluororesin layer of the base fluororesin-coated article and the fluororesin layer of the coating composition of the present invention are 1.5 Kg/cm or more, preferably 2 Kg/cm or more (see Peeling Test Method described later), and the fluororesin coating film has an adhesion evaluation point of 8 or more, preferably 10 or more, as measured by a crosscut tape test in accordance with JIS K5400-1990, 8.5.2. (see the related description given later) after 10 times repetition of the tape application-stripping procedure. From the standpoint of obtaining such an adhesion strength, the content of the pigment in the solid components is generally 60% by weight or less, preferably 50% by weight or less, more preferably 40% by weight or less. It should be noted that the adhesion strength to the base is affected by the kind of the base, that is, whether the base is one having a finely roughened surface and made of a metal, ceramic or the like or the base is a fluororesin-coated article.

In the case of using a fluororesin-coated article as a base on which the coating composition is applied, a sufficient adhesion strength can be obtained even when the coating composition has a relatively high pigment content. However, if the coating composition is to be applied on a metal or ceramic base to bond the resulting coating film to the base taking advantage of the surface roughness of the base, the coating composition should have a lower pigment content. In any event, in order that the coating composition satisfy all of these requirements, the solid content of the coating composition is generally from 20 to 60% by weight, preferably from 30 to 50% by weight, more preferably from 40 to 50% by weight. Further, the content of the pigment in the solid components is generally from 10 to 60% by weight, preferably from 10 to 50% by weight, more preferably from 15 to 40% by weight.

In the present invention, the adhesion strength between the base and the fluororesin layer and that between fluororesin layers are evaluated by the following methods.

Peeling Test Method

A fluororesin tape is heat-bonded to the coating film surface or printed pattern surface. The tape is then peeled in the direction of 180° and the peeling force required per a tape width of 1 cm is measured, the unit for the measured value being kg/cm.

Crosscut Tape Test Method

The coating film is crosshatch-wise incised in a manner provided for in JIS K5400-1990, 8.5.2 to form 100 pieces (10×10) of squares. An adhesive cellophane tape ("Cello Tape", manufactured by Nichiban Co., Ltd., Japan) is sufficiently bonded to the incised surface and then stripped immediately. This procedure is repeated 10 times and, thereafter, an adhesion evaluation point is obtained according to the adhesion evaluation method specified in the JIS standards as follows:

Adhesion Evaluation Point

10: No peeling square is observed.

8: 5% or less of squares out of 100 squares are peeled.

6: 5–15% of squares out of 100 squares are peeled.
4: 15–35% of squares out of 100 squares are peeled.
2: 35–65% of squares out of 100 squares are peeled.
0: 65% or more of squares out of 100 squares are peeled.

The coated article according to the second aspect of the invention are described in detail below.

As the base fluororesin-coated article to be used in producing the coated article according to the second aspect of the present invention, those obtained by any ordinary method can be employed. For example, it may be a fluororesin-coated article which has been shaped into a desired form, e.g., a pot, or may be a fluororesin-coated flat plate which has not been shaped. The shaped fluororesin-coated article may be those obtained by forming a shaped base made of a metal, glass, ceramics or the like and then coating the shaped base with a fluororesin, or may be one obtained by coating a flat plate made of a metal with a fluororesin and then shaping the coated plate into a desired form such as a pot. Although the coating method for an unshaped flat plate is not particularly limited, the flat plate base to be coated with a fluororesin is preferably one which is made of a metal and has been finely roughened. This is because the fluororesin-coated article obtained from such a base is less apt to suffer peeling of the coating film or other troubles when being shaped into a desired form such as a pot in a later step.

The fluororesin coating of the base fluororesin-coated article is not particularly limited, which contains or does not contain a pigment, and may be uniform or may have patterns such as a scale, design, or character. The fluororesin coating of the base fluororesin-coated article may also be produced by using a coating composition according to the present invention.

For coating the above-mentioned base fluororesin-coated article with the fluororesin coating composition according to the first aspect of the present invention, any of the ordinarily used coating or printing techniques can be employed. Examples thereof include spray coating, spin coating, screen printing, pad printing, letterpress printing, and intaglio printing, but other coating or printing techniques are also usable. Compared to conventional dispersion-type coating compositions which are suited only for spray coating and spin coating, the coating composition of the present invention has an advantage that it can be coated or printed by a wider range of commonly employed printing techniques.

In the case of applying the fluororesin coating composition of the present invention on a fluororesin-coated article of a flat plate shape to form a pattern such as a scale, design, or character, it is necessary that the pattern should be formed while pattern deformation is taken in account which will occur during shaping of the resulting coated base into a pot or other form.

A further major feature of the coated article according to the second aspect of the present invention is that after the fluororesin-coated article is coated with the fluororesin coating composition of the present invention, the resulting article is further coated with a second fluororesin coating composition containing substantially no pigment or adhesive. The finally formed coating layer of the second fluororesin coating composition serves as a protective layer which prevents the pattern, such as a scale, design, or character, from disappearing by wear. It is, therefore, necessary that the fluororesin coating composition for forming the protective layer should contain substantially no pigment or adhesive in order to prevent the protective layer from making the pattern unclear or having impaired surface non-tackiness. However, for the purpose of imparting surface gloss or improving wear resistance, it is possible to incorporate mica, pigment-coated mica, boron nitride or the like in such an amount as to not make the pattern unclear.

The coated article according to the third aspect of the present invention is described in detail below.

The base having a finely roughened surface, which is used in producing the coated article according to the third aspect of the present invention, may be made of a metal, glass, ceramic, or the like and has been shaped into a pot or other form. Alternatively, the base may be a flat plate made of a metal and having a finely roughened surface; the flat plate may be shaped into a pot or other form after being coated with a first fluororesin coating composition according to the first aspect of the present invention and then with a second fluororesin coating composition containing substantially no pigment or adhesive.

For coating the first fluororesin coating composition according to the first aspect of the present invention and for forming a protective layer by applying the second fluororesin coating composition thereover, the same methods as those for the coated article according to the second aspect of the present invention may be employed.

Examples of the finely roughened surface include those formed by ordinarily physical surface-roughening treatments such as sand blasting, grit blasting and the like. Preferred examples of the finely roughened surface include those formed mainly by chemical or electrochemical etching and those formed by a combination of both. The physical surface-roughening treatments may be employed in combination with the chemical or electrochemical etching.

Under the microscopic observation, the finely roughened surface has a sponge-like structure or a complicated surface structure in which a part of crystal grains of the material such as a metal has been removed by the roughening treatment.

The treating method for forming the finely roughened surface is not limited to chemical or electrochemical etching or the like, and any technique may be used in the present invention for forming the finely roughened surface as long as the roughened surface, when coated with PTFE only, shows a peel strength of about 2 Kg/cm.

The physical surface-roughening treatment alone, such as sand blasting or grit blasting, generally cannot produce a roughened surface which, when coated with PTFE alone, shows a peel strength of about 2 Kg/cm. Such a roughened surface is more easily obtained by subjecting an aluminum base or aluminum alloy base to electrochemical etching. Therefore, such a base and etching technique are especially preferably used.

In the coated articles according to the second and third aspects of the present invention, the thicknesses of the layer of the first fluororesin coating composition and the layer of the second fluororesin coating composition are generally from 5 to 50 $\mu$m, and preferably from 10 to 30 $\mu$m. The upper limit of the layer thickness can be determined based on the production cost, and the thickness larger than the above range can be employed with obtaining the effect of the present invention.

As described above, according to the fluororesin coating composition of the present invention and the coated articles obtained by using the composition, a display such as a scale can be formed without using stamping, thereby to obtain fluororesin-coated articles having a clear display which hardly wears is clear, and has a sufficient adhesion strength.

The fifth to ninth embodiments of the present invention will be described detail below.

In the fifth to ninth embodiments of the present invention, any of the fluororesin coating composition according to the present invention can be used.

The inventors made studies on the pigment-free or pigment-containing dispersion of a pigment-free or pigment-containing fluororesin using a dispersion medium mainly comprising a surfactant. As a result, they have found the relationship of the kind of a fluororesin suitable for preparation process including screen printing of a coating and subsequent sintering, the chemical structure of a surfactant, and the structure of a screen mesh.

In the screen printing process, a coating composition is applied to a screen mesh with a squeegee. Only the coating composition that has passed through the mesh forms a coating. Therefore, in order to provide a fluororesin coating on the entire surface by screen printing process, the following requirements (1) and (2) must be essentially met.

(1) Components necessary for the coating (e.g., fluororesin, dispersant, pigment) must pass through the mesh. The coating composition passed through the mesh must rapidly level and leave no traces of the mesh. The coating must exhibit a viscosity enough to maintain a desired thickness and coated shape (patterns). The coating and its components must not deteriorate when rubbed against the mesh with a squeegee.

(2) The sintering of the coating under heating must be effected under a practical conditions. The coating does not undergo coloration and deterioration of the physical properties of the fluororesin and coating during sintering.

The former conditions (1) are possibly determined by the size of the fluororesin particles, the shape of the mesh, the viscosity of the coating composition, etc. The latter conditions (2) are possibly determined by the chemical structure of the fluororesin and the surfactant.

The former conditions are associated with the components of the coating composition. Since a fluororesin is insoluble in a solvent, the coating composition is prepared by blending a fluororesin with a solvent and a surfactant. As such a fluororesin there may be used various compounds depending on the molecular structure. For example, PTFE (polytetrafluoroethylene), PFA (tetrafluoroethylene/ perfluoroalkylvinylether copolymer), FEP (tetrafluroethylene/hexafluoropropylene copolymer), ETFE (tetrafluoroethylene/ethylene copolymer), CTFE (polychlorotrifluoroethylene), PVdF (polyvinylidene fluoride), and copolymers thereof may be used singly or in admixture.

However, if a crystallizable polymer such as PTFE is used singly, the polymer component can deform into fibers when rubbed with a squeegee during screen printing, making it impossible to provide an excellent coating. This difficulty can be solved by using such a crystallizable polymer in admixture with a noncrystallizable polymer. From the standpoint of ease of formation of a stably dispersed coating and difficulty in occurrence of coat defects even in the presence of a large amount of a pigment component, to say nothing of the absence of pigment component, there can be preferably used a heat-melting fluororesin such as PFA, FEP, ETFE, CTFE and PVdF, particularly PFA and FEP in the light of heat resistance and abrasion resistance.

Such a fluororesin is available in the form of powder or dispersion. A fluororesin which exhibits excellent film-forming properties comprises spherical particles or those having irregular shapes having an average particles diameter of not less than 5 $\mu$m. Such a fluororesin comprising particles having an average grain diameter of 20 to 30 $\mu$m is suitable for the preparation of a coating having an adequate viscosity for the formation of a coat having a thickness of not less than about 20 $\mu$m and screen coating. Further, the incorporation of an appropriate amount of small fluororesin particles having an average grain diameter of not more than 10 $\mu$m in the foregoing large fluororesin grains is useful for the smoothening of the surface of the coating after sintering. This effect becomes remarkable particularly when the fluororesin particles are blended with various pigments by using small particles having iregural shapes.

In order to allow these particles to pass through the screen mesh, they need to have a particle diameter less than the opening length of the mesh. The opening length of the mesh can be defined as the value obtained by substracting the thread diameter a from the mesh pitch f, as shown in FIG. 1. In general meshes, f ranges from 50 $\mu$m to 600 $\mu$m, and a ranges from 25 $\mu$m to 160 $\mu$m, thus providing an opening length ranging from 25 $\mu$m to 500 $\mu$m. The mesh employable in the present invention preferably has an opening length of not less than 50 $\mu$m, more preferably not less than 100 $\mu$m.

As a pigment employable in the present invention, any pigment may be used. Typical examples of such a pigment include white pigments such as titanium oxide and zinc oxide, black pigments such as carbon black and acetylene black, chromatic pigments such as ultramarine, red oxide and iron oxide, and flake pigments such as boron nitride, mica, pigment-coated mica and fluorocarbon.

Besides the foregoing inorganic pigments, organic pigments, dyes or heat-resistant high molecular compounds may be used as necessary. For example, phthalocyanine pigments, indigo pigments, polyimide polyamideimide, polyimidepolyethersulfon, polyphenylene sulfide, and epoxy resins. These pigments may be used in the form of solution or powder dispersion.

These pigment components are properly adjusted in their amount to appear in a any desired color on the fluororesin coating after sintering. The amount of these pigment components varies with the kind and desired color of the pigment. In general, it is in the range of 0.001 to 10 wt % of the nonvolatile content in the coating.

The preparation process according to the present invention involves a thick coating that provides a coat having a thickness of not less than about 20 $\mu$m after dry-sintering by a single screen coating and thus is extremely useful in the actual production.

The thickness of the resulting coating can be determined by the equation (wet thickness of coating)×(fluororesin fraction in coating composition) (as defined in the fifth and sixth aspects of the present invention) or the equation (wet thickness of coating)×(fraction of nonvolatile component such as fluororesin and pigment in coating composition) (as defined in the seventh, eighth, and ninth aspects of the present invention). With the screen mesh maintained under the same conditions, an experiment was done with varying fluororesin fractions. As a result, it was confirmed that the fluororesin fraction and the thickness of the resulting coating are correlated with each other.

Figure 2:
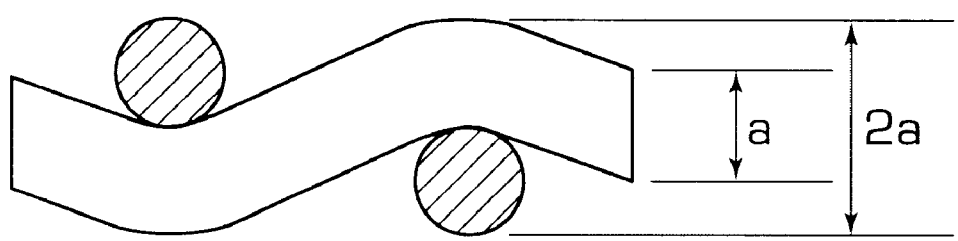
FIG. 2 is a schematic sectional view of the screen mesh shown in FIG. 1, wherein the symbol a represents thread diameter and the symbol f represents mesh pitch.

It can be presumed that the "average mesh thickness d" makes a major contribution to the wet thickness of the coating. An ordinary screen mesh is formed by knitting a thread (see FIGS. 1 and 2). In most cases, therefore, the mesh thickness is almost twice the thread diameter a. While the mesh thickness is twice the thread diameter a at the overlapped portion, it is the same as the thread diameter a at the nonoverlapped portion. In the case of a coarse screen mesh with a small mesh, its substantial thickness is nearer to the thread diameter a.

Accordingly, taking into account the area proportion of the overlapped portion, the "average mesh thickness d" is defined by the provision (3) for the first and second aspects of the present invention or the provision (4) for the seventh, eighth, and ninth aspects of the present invention. Conditions which are at least required to obtain a desired coat thickness can be presumed from the relationship (3) or (4).

$$x > t/(d \cdot k) \quad (3)$$

wherein x is fraction of the fluororesin, d is the average mesh thickness, and k is the opening ratio, each of which is represented by the following formulae:

$$d = 2a \times (a/f)^2 + a \times (1-(a/f)^2)$$

$$K = ((f-a)/f)^2$$

wherein a represents a thread diameter, and f represents the mesh pitch.

$$x > t/(d \cdot k) \quad (4)$$

wherein x is the fraction of nonvolatile components such as fluororesin and pigment, d is the average mesh thickness, and k is the opening ratio, each of which is represented by the following formulae:

$$d = 2a \times (a/f)^2 + a \times (1-(a/f)^2)$$

$$K = ((f-a)/f)^2$$

wherein a represents a thread diameter, and f represents the mesh pitch.

For the purpose of obtaining a coat having a thickness of not less than 20 µm as defined in the fifth and sixth aspects of the present invention, an experiment was done using a 120-mesh screen (pitch: 212 µm) having a thread diameter of 80 µm and a percent opening of 39%. As a result, while the required fluororesin fraction was calculated as not less than 56% according to the equation (3), a fluororesin fraction of 50% provided an insufficient thickness and a fluororesin fraction of 60% enabled the formation of a coating having a thickness of about 20 µm. Thus, the relationship (3) was confirmed reasonable.

The viscosity of the coating composition is an important factor of maintenance of coating thickness and leveling in the screen printing. Unlike ordinary solution type coating compositions, the fluororesin-dispersed coating composition according to the present invention normally exhibits pseudoplastic fluidity. Therefore, the viscosity of the fluororesin-dispersed coating composition according to the present invention cannot be evaluated by an apparatus for measuring a Newtonian fluid such as an ordinary Type B viscometer. A special viscometer capable of measuring a non-Newtonian fluid is required. The inventors employed a spiral viscometer (PC1-TL available from Marcom Co., Ltd.) to evaluate the viscosity of the coating composition.

The spiral viscometer is capable of measuring the apparent viscosity of a non-Newtonian fluid with the shear rate being kept constant. As a result, it was found that the screen printing can be effected when the apparent viscosity of the coating is in the range of 50 to 1,000 poise with the shear rate being kept at 6/sec. If the apparent viscosity of the coating exceeds the above specified range, it tends to give too low a fluidity that prevents the coating from extending and hence provides a poor leveling, resulting in poor surface properties of the coat. If the apparent viscosity of the coating falls below the above specified range, it tends to give difficulty in controlling the composition of the coating composition, resulting in a poor dispersion stability of the resin.

The latter conditions (2) are associated with the molecular structure of the fluororesin and the surfactant. The fraction x of fluororesin in the coating (as defined in the fifth and sixth aspects of the present invention) or the fraction x of nonvolatile component such as fluororesin and pigment in the coating (as defined in the seventh, eighth, and ninth aspects of the present invention) is defined by the equation (3) or (4), respectively. In most cases, the fraction x needs to range from 50 to 80% for an ordinary screen mesh, though depending on the desired coating thickness t. In order to prepare a coating composition that can maintain a fluororesin with such a fraction in a stable dispersion, a considerable amount of a surfactant is required. The selection of such a surfactant has a great effect on the formation of a coating.

If PFA is used as a fluororesin, the conditions under which the coating is dried and sintered are predetermined taking into account the melting point (300 to 310° C.) of PFA and the temperature at which PFA undergoes remarkable thermal decomposition (not lower than 400° C.). In the practical production process, it is desired that substrate coated with a fluororesin coating free of or containing a pigment are continuously thrown into a sintering furnace so that sintering can be completed in as short a period of time as possible.

Under these conditions, the surfactant needs to vaporize completely away from the coating. In order to meet the foregoing requirements, a nonionic surfactant is desirable.

Specific examples of such a nonionic surfactant include oxyethylene/oxypropylene copolymer (decomposition temperature: 160 to 180° C.), polyoxyethylene alkyl ether (decomposition temperature: 140 to 180° C.), polyoxyethylene alkyl phenyl ether (decomposition temperature: 170 to 260° C.), and compounds obtained by partially fluorinating these nonionic surfactant. However, since surfactants having aromatic rings such as benzene ring in its molecule, e.g., polyoxyethylene alkylphenyl ether exhibit a high decomposition temperature and thus can be often carbonized and remained in the coating, causing the coating to be colored, their amount should be minimized. This applies to surfactants containing multiple bonds as well. Further, surfactants containing heteroatoms such as nitrogen, sulfur and phosphorus tend to cause coloration and thus should not be used. Fluorine atoms cannot be a great cause of coloration even if they are contained in a surfactant. Therefore, such a surfactant may be used.

The coating composition may comprise water or a commonly used organic solvent and other dispersants such as liquid high molecular compound incorporated therein. These dispersants need to vaporize completely under the predetermined drying and sintering conditions and thus are desired to have a definite boiling point and a sufficiently low decomposition point.

The substrate to be screen-coated as defined in the seventh, eighth, and ninth aspects of the present invention is a roughened flat substrate. The roughening of the surface of the substrate may be effected by a chemical or electrochemical etching process, singly or in combination. Further, a physical roughening process such as sandblasting and gridblasting can be applied.

In any of these roughening processes, it is necessary that fine unevenness be provided on the surface of the substrate to enhance the adhesion strength of the coat. The degree of roughening (degree of unevenness) depends on the kind of the coating resin, the pigment component, and the required adhesion strength and thus cannot be specified. For example, the 10-point average roughness Rz can range from 4 to 50.

As the kind of the substrate there can be exemplified aluminum, and alloy mainly composed of aluminum. As such an aluminum alloy plate there can be used an Mg-Mn alloy plate. Further, there can be used a composite plate comprising a magnetic metal plate such as iron and stainless steel plate fused to such an aluminum or aluminum alloy plate (as disclosed in JP-A-5-116244). The foregoing materials are only by way of example, and other kinds of metal plates can be generally used.

In the fluororesin-coated plate prepared by the process according to the seventh aspect of the present invention, a pigment-containing fluororesin attaches directly to substantially the entire surface of a roughened metal plate to attain a sufficient adhesion strength. However, the surface of the fluororesin-coated plate after sintering may give a slightly rough touch rather than smooth touch depending on the kind (size, shape, material) or content of the pigment. In this case, the fluororesin-coated plate prepared by the process according to the seventh aspect of the present invention can be pressed on the fluororesin surface thereof under heating to increase the surface smoothness thereof and to prevent formation of pin holes (as defined in the eighth aspect of the present invention). The heating temperature is preferably in the range of ±50° C. of the melting point of the fluororesin, and more preferably in the range of ±30° C. of the melting point of the fluororesin. The heating time and the pressure are not particularly limited and may appropriately be determined for the desired effects.

In some detail, if PFA is used as a fluororesin, a process may be effected which comprises pressing the fluororesin-coated plate under heating to around the melting point of PFA (302 to 310° C.) with time.

The pressing apparatus may be of either the batch type in which several, several tens, or several hundreds of coated plates are overlapped and hot-pressed or the continuous type in which coated plates are passed between heated rolls. In other words, any arrangement that can provide sufficient pressure, heating and time to improve the surface smoothness of the coated plate may be used.

The fluororesin-coated plate thus prepared can be press-molded or stressed otherwise so that it is deformed into any shape for practical use. For example, it can be used as an inner pot for rice cooker.

The present invention will be explained in more detail with reference to the following examples, but the invention is not construed as being limited thereto.

EXAMPLE 1

A 2.0 mm-thick aluminum alloy plate ("ASB" manufactured by Kobe Steel, Ltd., Japan) was used as a base material. An electrochemical etching treatment of the aluminum alloy plate was conducted in an aqueous solution of ammonium chloride using the alloy plate as the anode at an electrical quantity of 25° C./cm$^2$, thereby finely roughening the surface of the plate.

A base layer-forming coating composition composed of 60 wt % of PTFE, 3 wt % of PAI (polyamideimide), 6 wt % of surfactant and 31 wt % of water was coated on the roughened surface of the plate and the coating was baked at 420° C. for 5 minutes, thereby forming a coating film having a thickness of about 20 μm. On this base layer, a first fluororesin coating composition for printing having the formulation shown in Table 1 was applied by screen printing to form a predetermined character pattern. The samples were then baked at 400° C. for 10 minutes. The coating composition for printing was evaluated for blur, cissing and leveling properties.

The blur, cissing and leveling properties were evaluated by the following manner:

(1) Blur

Blur at the edge of the character pattern was determined with the naked eye and evaluated for the following four grades:

A: No blur was observed.

B: Substantially no blur was observed.

C: Slight blur was observed but was permissible.

D: Significant blur was observed.

(2) Cissing

Cissing in the printed part (character pattern) was observed with the naked eye and evaluated for the following four grades:

A: No cissing was observed.

B: Substantially no cissing was observed.

C: Slight cissing was observed but was permissible.

D: Significant cissing was observed.

(3) Leveling properties

The difference in level between the printed part (character pattern) and the non-printed part was observed by touching with fingers and evaluated for the following four grades:

A: No difference in level was observed.

B: Substantially no difference in level was observed.

C: Slight difference in level was observed but was permissible.

D: Significant difference in level was observed.

On each of the samples in which the applied coating compositions were good in freedom from blur or cissing and in leveling properties, a second fluororesin coating composition for forming a second layer was coated which contained substantially no pigment, adhesive, or the like. The second fluororesin coating composition was composed of 60 wt % of PTFE, 6 wt % of surfactant and 34 wt % of water. The coating was then baked at 420° C. for 5 minutes. Each of the thus-obtained coated plates was evaluated for the properties shown in Table 2. Further, each coated plate was press-shaped into a pot and then evaluated as to whether the printed part had developed a pinhole.

The whiteness and pinhole were evaluated by the following manner:

(4) Whiteness

The surface of the coated part was observed with the naked eye, and loss of whiteness (color change to yellowish or brownish white) was evaluated for the following four grades:

A: No loss of whiteness was observed.

B: Substantially no loss of whiteness was observed.

C: Slight loss of whiteness was observed but was permissible.

D: Significant loss of whiteness was observed.

(5) Pinhole

An aqueous solution containing about 1% of sodium chloride and about 0.01% of phenolphthalein was put in a pot of the coated plate. An electric voltage of about from 10 to 30 V was applied between the aluminum base and the aqueous solution, and phenolphthalein developed red color in the vicinity to pinhole. The development of red color due to the formation of pinhole was observed and evaluated for the following four grades:

A: No pinhole was observed.

B: Substantially no pinhole was observed.

C: Slight pinhole was observed but was permissible.

D: Significant pinhole was observed.

TABLE 1

Coating composition for printing

| | *1 PFA (5 μm or larger particles) (g) | *2 PFA (1 μm or smaller particles) (g) | *3 Surfactant (nonionic) (g) | Water (g) | Butyl Cellosolve (g) | TiO$_2$ (g) | Blur | Cissing | Leveling property (thickness difference) |
|---|---|---|---|---|---|---|---|---|---|
| Ex. 1-1 | 26.25 | 11.25 | 38.75 | 11.25 | — | 12.5 | A | A | A |
| Comp. Ex. 1-1 | 26.25 | 11.25 | 438.75 | 11.25 | — | 12.5 | D | A | A |
| Ex. 1-2 | 26.25 | 11.25 | 188.75 | 11.25 | — | 12.5 | B | A | A |
| Ex. 1-3 | 26.25 | 11.25 | 63.75 | 11.25 | — | 12.5 | B | B | B |
| Comp. Ex. 1-2 | 26.25 | 11.25 | 1.44 | 11.25 | — | 12.5 | B | D | D |
| Comp. Ex. 1-3 | 26.25 | 11.25 | 6 | 44 | — | 12.5 | B | D | D |
| Comp. Ex. 1-4 | 26.25 | 11.25 | 6 | — | 44 | 12.5 | B | C | D |
| Comp. Ex. 1-5 | 26.25 | 11.25 | 6 | 22 | 22 | 12.5 | B | C | D |
| Comp. Ex. 1-6 | 33.25 | 14.25 | 38.75 | 14.25 | — | 2.5 | B | A | A |
| Ex. 1-4 | 31.50 | 12.15 | 37.85 | 12.15 | — | 5 | B | A | A |
| Ex. 1-5 | 14 | 6 | 44 | 6 | — | 30 | B | A | A |
| Comp. Ex. 1-7 | 3.50 | 1.50 | 48.5 | 1.50 | — | 45 | B | A | A |

Note:
*1: "MP102", manufactured by Du Pont-Mitsui Fluorochemicals Co., Ltd.
*2: Solid PFA in "AD-2-CR" manufactured by Daikin Industries, Ltd.
*3: "Octapol 45", manufactured by Sanyo Chemical Industries, Ltd.

TABLE 2

| | Adhesion strength (crosscut tape test) | Peel strength (kg/cm) | Whiteness | Occurrence of pinhole (printed part of press-shaped article) |
|---|---|---|---|---|
| Ex. 1-1 | 100/100 | 2.0 | B | A |
| Comp. Ex. 1-1 | — | — | — | — |
| Ex. 1-2 | 100/100 | 2.0 | B | A |
| Ex. 1-3 | 100/100 | 2.1 | B | A |
| Comp. Ex. 1-2 | — | — | — | — |
| Comp. Ex. 1-3 | — | — | — | — |
| Comp. Ex. 1-4 | — | — | — | — |
| Comp. Ex. 1-5 | — | — | — | — |
| Comp. Ex. 1-6 | 100/100 | 3.0 | D | A |
| Ex. 1-4 | 100/100 | 2.5 | B | A |
| Ex. 1-5 | 50/100 | 1.5 | B | B |
| Comp. Ex. 1-7 | 20/100 | 1.0 | B | D |

EXAMPLES 2 AND 3

A 2.0 mm-thick aluminum alloy plate ("ASB" manufactured by Kobe Steel, Ltd., Japan) was used as a base material. An electrochemical etching treatment of the aluminum alloy plate was conducted in an aqueous solution of ammonium chloride using the alloy plate as the anode at an electrical quantity of 25° C./cm$^2$, thereby finely roughening the surface of the plate.

A base layer-forming coating composition composed of 60 wt % of PTFE, 3 wt % of PAI, 6 wt % of surfactant and 31 wt % of water was coated on the roughened surface of the plate and the coating was baked at 420° C. for 5 minutes, thereby forming a coating film having a thickness of about 20 μm. On this base layer, a first fluororesin coating composition for printing having the formulation shown in Table 3 was applied by screen printing to form a predetermined character pattern the samples were then baked at 400° C. for 10 minutes. The coating composition for printing was evaluated for blur, cissing and leveling properties in the same manner as in Example 1.

On each of the samples in which the applied coating compositions were good in freedom from blur or cissing and in leveling properties, a second fluororesin coating composition for forming a second layer was coated which contained substantially no pigment, adhesive, or the like. The second fluororesin coating composition was composed of 60 wt % of PTFE, 6 wt % of surfactant and 34 wt % of water. The coating was then baked at 420° C. for 5 minutes. Each of the thus-obtained coated plates was evaluated for the properties shown in Table 4 in the same manner as in Example 1. Further, each coated plate was press-shaped into a pot and then evaluated as to whether the printed part had developed a pinhole in the same manner as in Example 1.

TABLE 3

Coating composition for printing

| | *1 PFA (5 μm or larger particles) (g) | *2 PFA (1 μm or smaller particles) (g) | *3 Surfactant (nonionic) (g) | Water (g) | TiO$_2$ (g) | Ultra-marine (g) | Blur | Cissing | Leveling property (thickness difference) |
|---|---|---|---|---|---|---|---|---|---|
| Ex. 1-1 | 26.25 | 11.25 | 38.75 | 11.25 | 12.5 | — | A | A | A |
| Ex. 3-1 | 26.25 | 11.25 | 38.75 | 11.25 | 12.5 | 0.1 | A | A | A |
| Ex. 2-1 | 26.25 | 11.25 | 38.75 | 11.25 | 12.5 | 0.3 | A | A | A |
| Ex. 2-2 | 26.25 | 11.25 | 38.75 | 11.25 | 12.5 | 1.0 | A | A | A |

TABLE 3-continued

| | Coating composition for printing | | | | | | | | |
|---|---|---|---|---|---|---|---|---|---|
| | *1 PFA (5 μm or larger particles) (g) | *2 PFA (1 μm or smaller particles) (g) | *3 Surfactant (nonionic) (g) | Water (g) | TiO$_2$ (g) | Ultra- marine (g) | Blur | Cissing | Leveling property (thickness difference) |
| Ex. 2-3 | 26.25 | 11.25 | 38.75 | 11.25 | 12.5 | 3 | A | A | A |
| Ex. 3-2 | 26.25 | 11.25 | 38.75 | 11.25 | 12.5 | 5 | A | A | A |

Note:
*1: "MP102", manufactured by Du Pont-Mitsui Fluorochemicals Co., Ltd.
*2: Solid PFA in "AD-2-CR" manufactured by Daikin Industries, Ltd.
*3: "Octapol 45", manufactured by Sanyo Chemical Industries, Ltd.

TABLE 4

| | Adhesion strength (crosscut tape test) | Peel strength (kg/cm) | White- ness | Occurrence of pinhole (printed part of press-shaped article) |
|---|---|---|---|---|
| Ex. 1-1 | 100/100 | 2.0 | B | A |
| Ex. 3-1 | 100/100 | 2.0 | B | A |
| Ex. 2-1 | 100/100 | 1.9 | A | A |
| Ex. 2-2 | 100/100 | 2.1 | A | A |
| Ex. 2-3 | 100/100 | 2.0 | A | A |
| Ex. 3-2 | 100/100 | 2.0 | B | A |

Note:
Ex. 2-1 to Ex. 2-3 gave particularly good results.

EXAMPLE 4

PFA (MP102; average grain diameter: 20 μm; available from Mitsui Du Pont Fluorochemical Co., Ltd.) was used as a fluororesin. Coating compositions comprising various surfactants as set forth in Table 5 were prepared with a fluororesin fraction of 70%. These coating compositions were each screen-printed on a substrate (PTFE-coated aluminum plate having a diameter of 10 cm). The screen used was of 120-mesh and had a thread diameter of 80 μm. The coated material was allowed to stand at room temperature for 30 minutes. The ambient temperature was then elevated from 50° C. to 250° C. in 17 minutes. The coating was dried and sintered at a temperature of 250° C. for 12 minutes and then at a temperature of 380° C. for 24 minutes to obtain a coated article. The coating thickness was measured by means of an eddy current type film thickness gauge. The adhesion strength of the coat was evaluated by cross-cut adhesion test (1 mm pitch; tape peeling: 20 times; 100/100). The coloration of the coating was evaluated by the difference in color between the coating and the substrate determined by means of a chromoscope (available from Minolta Camera Co., Ltd.). The viscosity is the apparent viscosity determined by spiral viscometer (share rate: 6/sec; room temperature).

TABLE 5

| Surfactant | | Coating composition | Viscosity (poise) | Coating thickness (μm) | Adhesion strength (100/100) | Color difference |
|---|---|---|---|---|---|---|
| Oxyethlene/ oxypropylene copolymer | | | | | | |
| PL910 | A | Surfactant 30% | 380 | 27 | 100/100 | good |
| (Sanyo Chemical) | B | Surfactant 30% Butyl cellosolve 4% | 300 | 29 | 100/100 | good |
| Pronon 102 | C | Surfactant 30% | 530 | 29 | 100/100 | good |
| (Nihon Yushi) | D | Surfactant 30% Butyl cellosolve 4% | 420 | 32 | 100/100 | good |
| Polyoxyethylene octylphenyl ether | | | | | | |
| Octapol #45 | E | Surfactant 30% | 1,020 | 23 | 100/100 | poor |
| (Sanyo Chemical) | F | Surfactant 30% Water 4% | 560 | 24 | 100/100 | poor |
| Aliphatic alkylolamide | | | | | | |
| Profan EX24 | G | Surfactant 30% | 790 | 26 | 100/100 | poor |
| (Sanyo Chemical) | H | Surfactant 30% Butyl cellosolve 4% | 620 | 24 | 100/100 | poor |

Table 5 shows that all the coating compositions exhibit excellent adhesion strength, and the use of the surfactants containing benzene rings (E, F) and those containing nitrogen atoms (G, H) cause the coating to be colored, while the use of the surfactants free of aromatic rings, multiple bonds and heteroatoms (A to D) do not.

EXAMPLE 5

Similarly to Example 4, PFA (MP102; average grain diameter: 20 μm; available from Mitsui Du Pont Fluorochemical Co., Ltd.) was used as a fluororesin. Coating compositions comprising Octapol #45 and Newpole PE61 (available from Sanyo Chemical Industries Co., Ltd.) as surfactants were prepared with a fluororesin fraction of 50%, 60%, and 70%, respectively. These coating compositions were each screen-printed on a substrate (PTFE-coated 2-mm thick aluminum plate having a diameter of 10 cm). Two kinds of screens as set forth in Table 6 were used (80-mesh and 120-mesh). The coated material was allowed to stand at room temperature for 30 minutes. The coat was dried and sintered at a temperature of 100° C. for 5 minutes, at a temperature of 250° C. for 5 minutes and then at a temperature of 390° C. for 20 minutes to obtain a coated article. The coating thickness was measured by means of an eddy current type film thickness gauge. The results are set forth in Table 7. The viscosity is the apparent viscosity determined by spiral viscometer (share rate: 6/sec; room temperature).

TABLE 6

| Name | Mesh (per/inch) | Thread diameter a (μm) | Pitch f (μm) | Average mesh thickness d (μm) | Opening ratio k (%) |
|---|---|---|---|---|---|
| 80M | 80 | 50 | 318 | 51.2 | 71 |
| 120M | 120 | 80 | 212 | 91.2 | 39 |

TABLE 7

| No. | Surfactant | Resin fraction x (%) | Viscosity (poise) | Mesh | Measured thickness (μm) | x × d × k (μm) |
|---|---|---|---|---|---|---|
| 1 | Octapol #45 | 50 | 750 | 80M | 8.8 | 18.2 |
| 2 | " | " | " | 120M | 7.8 | 17.2 |
| 3 | " | 60 | 780 | 80M | 11 | 21.8 |
| 4 | " | " | " | 120M | 21 | 21.3 |
| 5 | " | 70 | 1,020 | 80M | 23 | 25.4 |
| 6 | " | " | " | 120M | 24 | 24.9 |
| 7 | Newpole PE61 | 60 | 440 | 80M | 10 | 21.8 |
| 8 | " | " | " | 120M | 21 | 21.3 |
| 9 | " | 70 | 780 | 80M | 19 | 25.4 |
| 10 | " | " | " | 120M | 23 | 24.9 |

Tables 2 and 3 show that the relationship (3) is satisfied as a requisite.

EXAMPLE 6

A 2.0-mm thick aluminum alloy plate (ASB available from Kobe Steel Ltd.) was used as a substrate. The aluminum alloy plate was anodically subjected to electrochemical etching in an aqueous solution of ammonium chloride with 25 coulomb/cm$^2$ so that it was roughened. Fluororesin coating compositions having the compositions as set forth in Table 8 were then prepared.

TABLE 8

| No. | PFA (average particle diameter) 20 μm | 7 μm | Mica 10–60 μm | Carbon black | TiO$_2$ | Surfactant *1 | *2 | Solvent *3 |
|---|---|---|---|---|---|---|---|---|
| (a) | 168 | none | 7 | 0 | 0 | 25 | 50 | — |
| (b) | 167 | none | 7 | 0.2 | 0.8 | 25 | 50 | — |
| (c) | 156 | none | 8.8 | 0 | 0 | 25 | 50 | — |
| (d) | 156 | none | 8.8 | 0.5 | 8.8 | 25 | 50 | — |
| (e) | 43 | 100 | 6 | 0.15 | 0.6 | 12.5 | — | 87.5 |
| (f) | 43 | 100 | 4.5*4 | 0.1 | — | 25 | — | 75 |

(Note) *1: Oxyethylene/oxypropylene copolymer
*2: Polyoxyethylene alkyl ether
*3: Diethyleneglycol dibutyl ether
*4: Mica (average grain diameter<15 μm)

These coating compositions were each screen-coated on the roughened aluminum plate (90 mm in diameter). The screen mesh used for the coating compositions (a) and (b) was of 120-mesh and had a thread diameter of 80 μm and an opening length of 132 μm. The screen mesh used for the coating compositions (c), (d), (e) and (f) was of 80-mesh and had a thread diameter of 120 μm and an opening length of 198 μm. The coated materials thus obtained were then dried and sintered at a temperature of 100° C. for 5 minutes, at a temperature of 250° C. for 10 minutes, and then at a temperature of 390° C. for 20 minutes. The coatings thus obtained all had a thickness of about 40 μm and a sufficient adhesion strength.

The coating compositions (b) and (d) gave a slightly rough surface. After sintering, the specimens of the coating compositions (a) to (d) were smoothened by means of a hot press at a temperature of 430° C. under a pressure of 550 kg/cm$^2$ for 3 hours. As a result, the surface roughness was removed to attain complete leveling. The results of evaluation by a roughness gauge (Ra: represented by central line average roughness) are set forth in Table 9.

TABLE 9

| (Ra: central line average roughness) | | | | | | |
|---|---|---|---|---|---|---|
| | (a) | (b) | (c) | (d) | (e) | (f) |
| After sintering | 4 | 12 | 5 | * | 1.8 | 1.2 |
| After hot-pressing | 1 | 1.7 | 1 | 5 | — | — |

(Note)
*: unmeasurable

As has been mentioned, the process for the preparation of a fluororesin-coated article and a fluororesin-coated shaped article according to the present invention attains the entire coating with a fluororesin by a screen coating technique. The preparation process according to the present invention can apply to the conventional production of inner pot for rice cooker as well as enables fluororesin finish and water-repellent finish of as large an area as 1 meter on an industrial basis. Particularly, in the production of inner pot for rice cooker, grill pan, inner vessel for thermos, etc., the present invention provides a fluororesin coat of 20 μm or more at a simple process. The present invention further provides an easy formation of patterns having various color tones and shapes.

While the invention has been described in detail and with reference to specific embodiments thereof, it will be apparent to one skilled in the art that various changes and modifications can be made therein without departing from the spirit and scope thereof.

What is claimed is:

1. A fluororesin coating composition comprising a dispersing medium and fluororesin particles dispersed therein, wherein said dispersing medium comprises 60% by weight or more of a liquid nonionic surfactant.

2. A fluororesin coating composition as claimed in claim 1, wherein the amount of said surfactant in said dispersing medium is 70% by weight or more.

3. A fluororesin coating composition as claimed in claim 1, wherein said fluororesin coating composition further comprises pigment particles dispersed in said dispersing medium.

4. A fluororesin coating composition as claimed in claim 3, wherein the amount of said surfactant in said dispersing medium is 70% by weight or more.

5. A fluororesin coating composition as claimed in claim 1, wherein said nonionic surfactant is at least one surfactant selected from the group consisting of an oxyethylene/oxypropylene copolymer, a polyoxyethylene alkyl ether, a polyoxyethylene alkyl phenyl ether, a perfluoroalkylamineoxide, a perfluoroalkylethylene-oxide adduct, a perfluoroalkyl oligomer, a fluoroalkylethyleneoxide adduct and a fluoroalkylester.

6. A fluororesin coating composition as claimed in claim 3, wherein said nonionic surfactant is at least one surfactant selected from the group consisting of an oxyethylene/oxypropylene copolymer, a polyoxyethylene alkyl ether, a polyoxyethylene alkyl phenyl ether, a perfluoroalkylamineoxide, a perfluoroalkylethylene-oxide adduct, a perfluoroalkyl oligomer, a fluoroalkylethyleneoxide adduct and a fluoroalkylester.

7. A fluororesin coating composition as claimed in claim 2, wherein said nonionic surfactant is at least one surfactant selected from the group consisting of an oxyethylene/oxypropylene copolymer, a polyoxyethylene alkyl ether, a polyoxyethylene alkyl phenyl ether, a perfluoroalkylamineoxide, a perfluoroalkylethylene-oxide adduct, a perfluoroalkyl oligomer, a fluoroalkylethyleneoxide adduct and a fluoroalkylester.

8. A fluororesin coating composition as claimed in claim 4, wherein said a nonionic surfactant is at least one surfactant selected from the group consisting of an oxyethylene/oxypropylene copolymer, a polyoxyethylene alkyl ether, a polyoxycthylene alkyl phenyl ether, a perfluoroalkylamineoxide, a perfluoroalkylethylene-oxide adduct, a perfluoroalkyl oligomer, a fluoroalkylethyleneoxide adduct and a fluoroalkylester.

9. A fluororesin coating composition as claimed in claim 1, wherein said nonionic surfactant comprises a polyoxyethylene alkyl phenyl ether.

10. A fluororesin coating composition as claimed in claim 5, comprising a dispersing medium and at least two fluororesins dispersed therein.

11. A fluororesin coating composition as claimed in claim 6, comprising a dispersing medium and at least two fluororesins dispersed therein.

12. A fluororesin coating composition as claimed in claim 9, comprising a dispersing medium and at least two fluororesins dispersed therein.

13. A fluororesin coating composition as claimed in claim 1, having a solid content of 20% by weight or more.

14. A fluororesin coating composition as claimed in claim 1, having a solid content of 30% by weight or more.

* * * * *